Aug. 25, 1936.  J. W. LOGAN, JR  2,052,204
BRAKE RETARDATION CONTROLLER
Filed Feb. 7, 1934  2 Sheets-Sheet 1
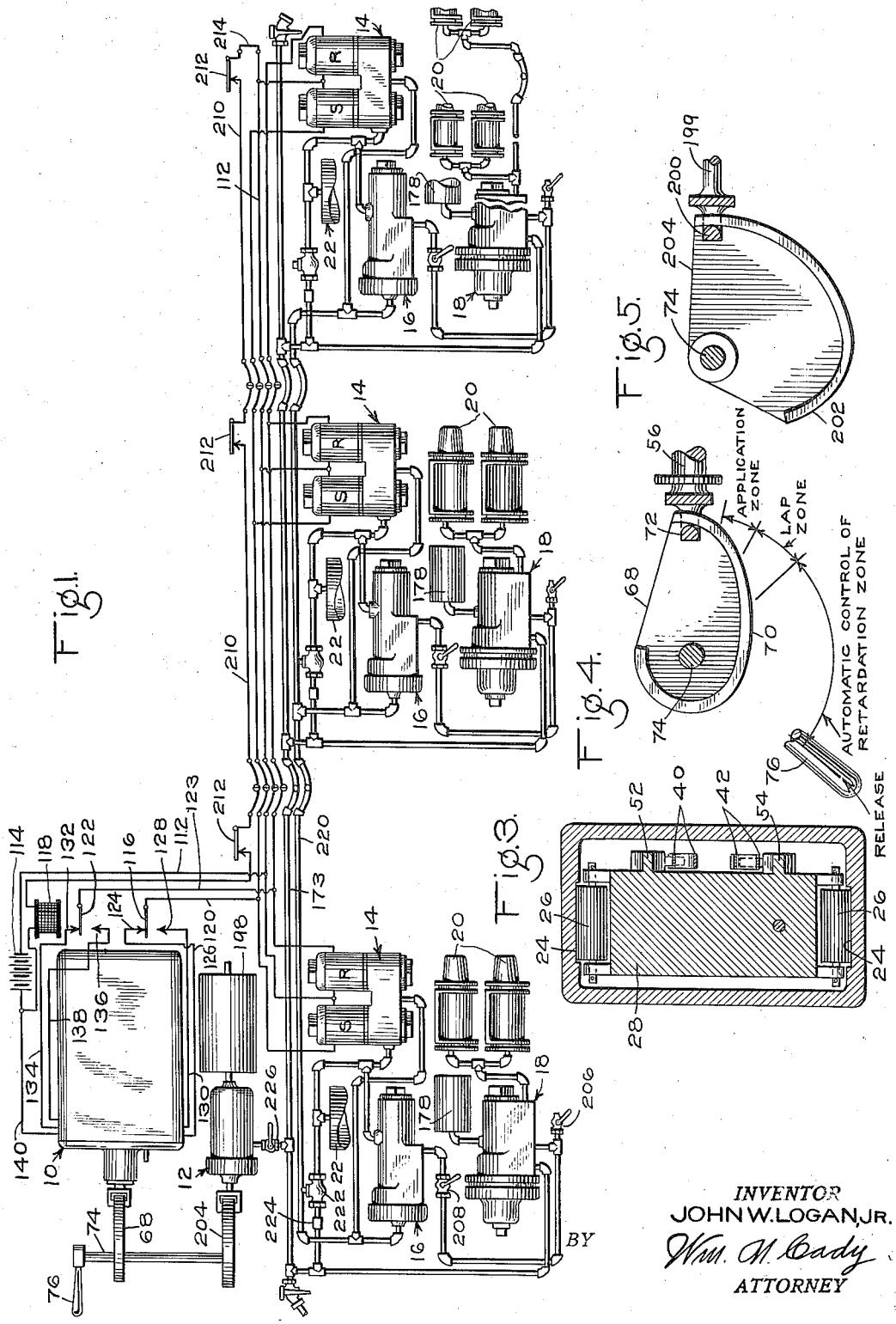
INVENTOR
JOHN W. LOGAN, JR.
ATTORNEY

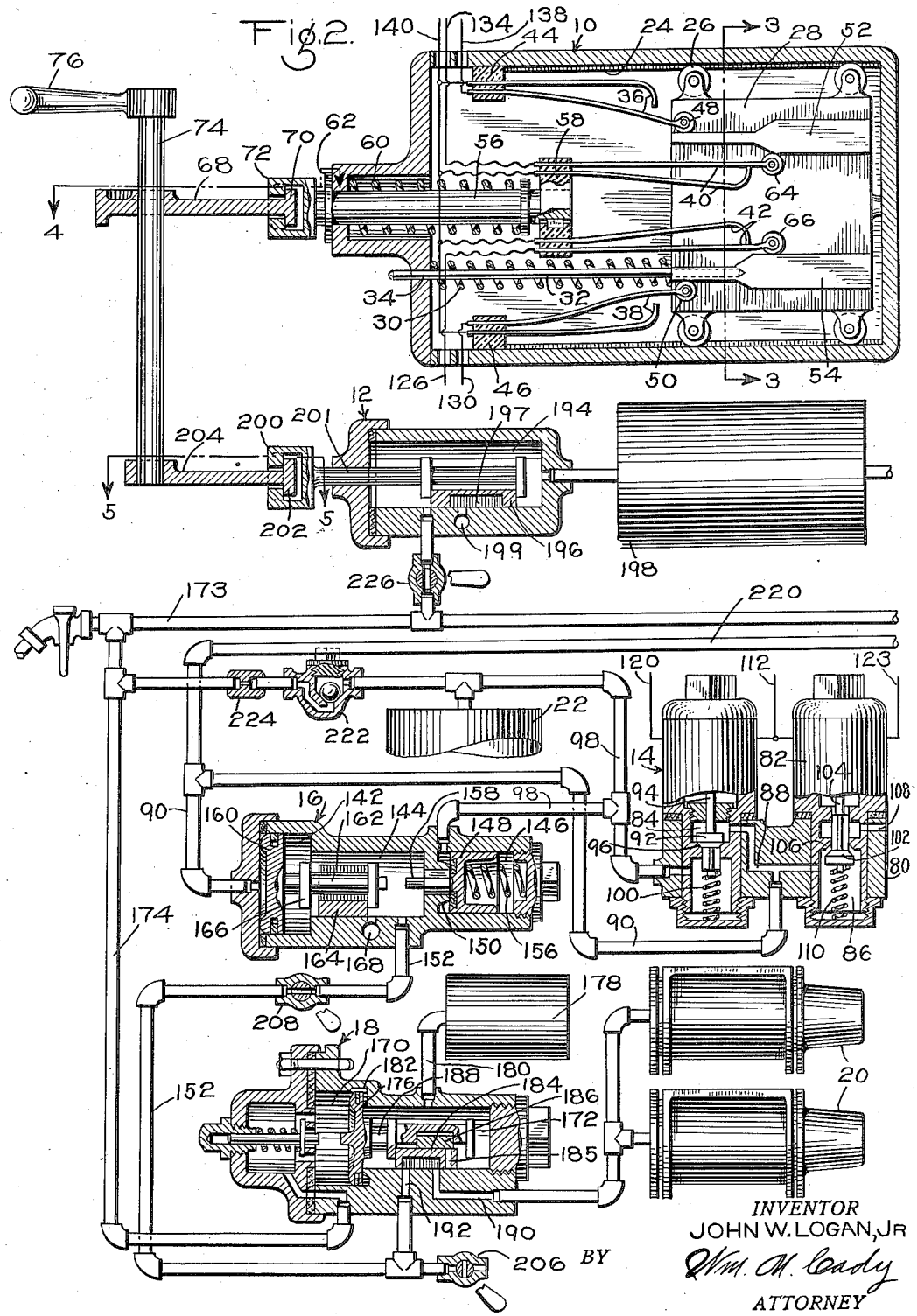

Patented Aug. 25, 1936

2,052,204

UNITED STATES PATENT OFFICE 2,052,204

BRAKE RETARDATION CONTROLLER

John W. Logan, Jr., Wilkinsburg, Pa., assignor to The Westinghouse Air Brake Company, Wilmerding, Pa., a corporation of Pennsylvania Application February 7, 1934, Serial No. 710,087

15 Claims. (Cl. 303—24)

This invention relates to brake retardation controller apparatus for controlling the brakes on a railway train.

In the operation of high speed trains, particularly those used for interurban service, it is highly desirable that the trains be brought to a stop at stations in the shortest possible time, so that fast schedules may be maintained. One method of making such stops consists of bringing the train to a stop at a constant rate of retardation, this rate being the maximum which track conditions will permit. In bringing a train to a stop in this manner a smooth stop can be made by diminishing the rate of retardation at the end of the deceleration period, thereby adding greatly to the comfort of the passengers, as well as minimizing the danger of severe shock to the train.

It is a principal object of my invention to provide a braking equipment having means embodied therein for controlling the brakes to produce a rate of retardation, due to operation of the brakes, which is substantially constant.

Another object of my invention is to provide a braking apparatus in which different practical rates of retardation may be selected, and in which the rate selected is automatically maintained until the vehicle or train is brought to a stop, or until a different rate is selected.

A further object is to provide a braking equipment which may be controlled by a manually operated retardation controller device, to maintain any desired practical rate of retardation, or by the usual brake valve device to effect an application of the brakes in accordance with a desired braking pressure.

A yet further object of my invention is to provide an apparatus of the general character referred to, which has provision for the operation of the brakes from a towing vehicle, in case the train cannot proceed under its own power and need be towed to a service shop.

Yet other objects and advantages of my invention will be more fully understood from the following description, taken in connection with the attached drawings, in which Figure 1 is a schematic arrangement of apparatus comprising one embodiment of my invention arranged for use in connection with a three unit, articulated type of train.

Figure 2 is an enlarged and more detailed view of the equipment shown in Fig. 1 for the head end or control car.

Figure 3 is a view along the line 3—3 of Fig. 2.

Figure 4 is a view along the line 4—4 of Fig. 2.

Figure 5 is a view along the line 5—5 of Fig. 2.

In the embodiment shown in Figure 1 there has been provided on the head end or control car a retardation controller device 10, for controlling the brakes throughout the train in accordance with a preselected rate of retardation, and a brake valve device 12, for controlling the brakes throughout the train in the usual manner.

The braking equipment on each unit comprises a magnet valve device 14, the operation of which is controlled by the retardation controller device 10, a relay valve device 16, and a triple valve device 18, the operation of which is controlled by operation of the brake valve device 12.

As will more fully hereinafter appear, the supply of fluid under pressure to the brake cylinders 20 on each unit may be automatically controlled by the retardation controller device 10, in cooperation with the magnet valve device 14 and the relay valve device 16, or manually by the brake valve device 12, in cooperation with the triple valve device 18.

Considering first now the automatic controlling apparatus, the retardation controller device 10 is embodied in a casing having a trackway 24 adapted to receive rollers 26 secured to and providing for movement of an inertia operated body 28. Movement of the body 28 to the left is opposed by a spring 30 disposed concentrically on a rod 32 having one end thereof secured to the body 28 and the other end thereof interfitting with a bore 34 in the casing. The body is thus urged to a biased position to the right, as shown in Figure 2. Within the casing are stationary resilient contact elements 36 and 38, and movable resilient contact elements 40 and 42. The stationary contact elements 36 and 38 are secured to opposite walls of the casing, and the elements of each contact group insulated from each other by insulating members 44 and 46. These contact elements are urged out of contacting relation by their own resiliency, but are adapted to be urged into contacting relation by engagement of rollers 48 and 50 associated therewith, respectively, with cam members 52 and 54 secured to the body 28.

The cam members 52 and 54 are provided with high and low portions. When the rollers 48 and 50 are in engagement with the low portion of these two cams, the resilient elements 36 and 38 will be out of contacting relation, but when the rollers engage the high portion of the cams the elements are urged into contacting relation.

The movable contact elements 40 and 42 are carried by a plunger 56 and properly insulated therefrom and from each other by an insulating member 58. Disposed concentrically of the plunger 56 is a spring 60 adapted to urge the plunger 56 to the right, a collar 62 being provided on the plunger for engagement with a portion of the casing to limit the distance to which the plunger may be moved to the right.

Like the stationary contacts 36 and 38, the movable contact elements 40 and 42 are urged out of contacting relation by their own resiliency, and into contacting relation by engagement of rollers 64 and 66 associated therewith, respectively, with other high portions of the cam members 52 and 54. These cam members are also provided with other low portions adapted to be engaged by the rollers 64 and 66. When the rollers 64 and 66 are in engagement with the low portions of the cam the contact elements 40 and 42 are urged out of contacting relation.

The high and low portions of the cams 52 and 54 are so arranged that when the body 28 is moved to the left, cam 54 will cause engagement of the stationary contacts 38 before cam 52 causes engagement of the stationary contacts 36. In a similar manner, when the movable contacts 40 and 42 are moved to the left from the position shown in Figure 2, the contacts 40 will be opened ahead of the contacts 42. Or conversely, if the movable contacts are positioned to the left and the body 28 is moved to the left, then contacts 42 will be closed ahead of contacts 40. The purpose of the opening and closing of these stationary and movable contacts will appear presently.

For positioning the movable contacts 40 and 42 in different positions with respect to the movable body 28, I have provided a manually operated cam member 68, having a peripheral flange 70 interfitting with a T-slot in a head portion 72 integral with the plunger 56. The cam member 68 is secured to a shaft 74, which is rotatable by a handle 76 secured thereto.

As is more clearly shown in Figure 4, when the handle 76 is moved in a counterclockwise direction, the cam 68 causes movement of the plunger 56 to the left in a graduated fashion, so that the movable contacts 40 and 42 are positioned different distances between their biased position to the right and their extreme position to the left. As will more fully hereinafter appear, operation of the handle 76 functions to select different rates of retardation to be automatically maintained by the retardation controller device and apparatus to be subsequently described.

As before stated, the retardation controller device controls operation of the magnet valve devices 14. Each of these magnet valve devices comprises a valve section 80 and a magnet section 82. The valve section 80 is provided with a supply valve chamber 84 connecting with a release valve chamber 86 by a passage 88. The passage 88 leads to the connected relay valve device 16 through pipe 90, the purpose of which will hereinafter more fully appear.

Disposed in the supply valve chamber 84 is a supply valve 92, secured to a valve stem 94 and cooperating with a seat 96 to control the supply of fluid under pressure from a local reservoir 22 and supply pipe 98 to the passage 88 and pipe 90, and from thence to the relay valve device 16. The supply valve 92 is urged to unseated position by a spring 100 and to seated position by an electromagnet in the upper or magnet valve section 82, which, when energized, moves the stem 94 downwardly to seat the valve.

Disposed in the release valve chamber 86 is a release valve 102, secured to a stem 104 and cooperating with a seat 106 to control the release of fluid pressure from the passage 88, and pipe 90 leading to the relay valve device 16, to the atmosphere by way of port 108. The release valve is urged toward seated position by a spring 110, and to unseated position by an electromagnet in the magnet section 82, which when energized, moves the valve stem 104 downwardly to unseat the release valve.

One terminal of each of the windings of the electromagnets in the magnet section 82 is connected to a suitable source of current supply by conductor 112. This source of current supply may be local or otherwise, and I have, as one example, indicated a battery 114.

The other terminal of the electromagnet controlling the supply valve 92 is connected to a movable contact arm 116 of a selective relay 118, by conductor 120. The other terminal of the electromagnet controlling the release valve 102 is connected to another movable contact arm 122 of the selective relay 118, by conductor 123. The movable contact arm 116 is adapted to contact with either a stationary contact 124, which is connected to one of the movable contact elements 42 by conductor 126, or with stationary contact 128, which is connected to one of the stationary contact elements 38 by conductor 130.

In a like manner, the movable contact arm 122 is adapted to contact with either a stationary contact 132, which is connected to one of the movable contact elements 40 by conductor 134, or with another stationary contact 136, which is connected to one of the stationary contact elements 36 by conductor 138. The other of each of the contact elements 36, 38, 40 and 42 is connected to the battery 114 by conductor 140.

When the selective relay 118 is energized, the movable contact arms 116 and 122 are moved to their uppermost position, where they contact with stationary contacts 124 and 132, respectively. It will thus be seen that with the selective relay energized the movable contacts 40 and 42 are effective in controlling operation of the magnet valve devices 14.

When the selective relay 118 is deenergized, the movable contact arms 116 and 122 drop to their lowermost position, where they contact stationary contacts 128 and 136, respectively. When this occurs it will be seen that the stationary contacts 36 and 38 of the retardation controller device are effective in controlling operation of the magnet valve devices 14. The purpose of this arrangement will hereinafter more fully appear.

Each of the relay valve devices 16 is embodied in a casing provided with a piston chamber 142, and valve chambers 144 and 146. Chambers 144 and 142 are in constant, open communication with each other, while the communication between chambers 144 and 146 is controlled by a valve 148 coacting with a seat 150 therebetween.

The chamber 144 has connected therewith a pipe 152 leading to the brake cylinders 20, by way of the triple valve device 18. The chamber 146 is connected with the local reservoir 22 by pipe 98, and it will thus be seen that the valve 148 controls the supply of fluid under pressure from the reservoir 22 to the brake cylinders, by way of pipe 152 and triple valve device 18. The valve 148 is urged toward seated position by a spring 156, and is provided with a stem 158 projecting into the chamber 144.

Operatively mounted in the piston chamber 142 is a piston 160, which has secured thereto a rod 162 adapted to engage the stem 158 when the piston is moved to the right. The portion of the piston chamber 142 to the left of the piston 160 is connected to the magnet valve device 14 by the aforementioned pipe 90, so that when the supply valve 92 of the magnet valve device is unseated fluid under pressure will flow to the piston chamber to one side of the piston and move it to the right and thus bring the rod 162 into engagement with the stem 158, thereby unseating the valve 148 to permit fluid under pressure to flow to the brake cylinders.

The chamber 144 is connected with the atmosphere by a port and passage 168. Disposed in the chamber 144 is a slide valve 164 adapted to be actuated by the piston 160. When fluid under pressure is supplied to the left side of the piston 160, it will be moved to the right, and after a short movement a collar 166 on the rod 162 will engage the slide valve and cause it to blank the port and passage 168 before engagement of the rod with the stem 158 to unseat the valve 148.

When fluid pressure in the piston chamber to the left of the piston has been reduced, the pressure in the chamber to the right of the piston, due to the unseating of the valve 148, will cause the piston to move to the left, and after disengagement of the rod 162 from the stem 158, and the seating of the valve 148, the slide valve 164 will be moved to again connect chamber 144 to the atmosphere, and thus release the fluid pressure in the brake cylinders to the atmosphere. Operation of the relay valve device 16 is, therefore, controlled by the magnet valve device 14 to control the supply of fluid under pressure from the local reservoir 22 to the brake cylinders.

The triple valve device 18 is embodied in a casing provided with a piston chamber 170 and a valve chamber 172. The piston chamber 170 is connected with a brake pipe 173, extending throughout the train, by a branch pipe 174. Operatively mounted in the piston chamber 170 is a piston 176, which is opposed on one side by brake pipe pressure and on the other side by pressure from an auxiliary reservoir 178 connected to the chamber 172 by pipe 180. A feed groove 182 is provided for recharging the auxiliary reservoir 178 from the brake pipe in the usual manner.

Disposed in the valve chamber 172 is a slide valve 184 having associated therewith a graduating valve 186, both of which are adapted to be actuated by a rod 188 secured to the piston 176, in the manner well known to those skilled in the art.

When the slide valve 184 is held in release position, as shown, a passage 190 leading to the brake cylinders 20 is connected with a passage 192, to which is connected the pipe 152 leading to the local reservoir 22, through the relay valve device 16. Fluid under pressure may, therefore, be supplied to the brake cylinders by operation of the relay valve device so long as the slide valve of the triple valve device is held in release position.

When a reduction in brake pipe pressure is effected the over-balancing pressure on the one side of the piston 176 due to the supply from the auxiliary reservoir 178, will cause the piston to move to the left and thus disconnect passages 192 and 190, and connect passage 190 with the auxiliary reservoir 178 through port 185 in the slide valve 184. When the piston is thus caused to move the slide valve to application position, the control of the supply of fluid under pressure to the brake cylinders is transferred from the relay valve devices 16 to the triple valve devices.

For controlling operation of the triple valve devices, I have provided the aforementioned brake valve device 12, which comprises a casing having a valve chamber 194, in which is disposed a slide valve 196 adapted to control the supply of fluid under pressure from a main reservoir 198 to the brake pipe 173, and the release of pressure from the brake pipe to the atmosphere by way of port and passage 199.

For actuating the slide valve 196 I have provided a rod 201 having a head portion 200 provided with a T-slot, with which interfits a flanged portion 202 of a cam member 204 secured to the aforementioned shaft 74.

As will appear later, during the movement of the handle 76 which effects movement of the movable contacts of the retardation controller device 10, the slide valve 196 is held in release position, that is, normal pressure in the brake pipe and main reservoir is maintained.

In the usual braking equipment, when the triple valve device is in release position, the brake cylinders are vented to the atmosphere. To prevent this in my invention when the braking of the train is controlled by the retardation controller device, I have provided a cock 206 associated with each triple valve device on each unit in the train, and which is normally maintained in cut-off position, but which may be moved to open position when it is desired to control the brakes wholly by the brake valve device 12. When this is desired the relay valve device 16 may be disconnected from the triple valve device by another cock 208.

The operation of this embodiment of my invention is as follows:

Assuming that the train is traveling at a constant rate of speed on a level trackway, the relative position of the parts of each device on each unit in the train will be as shown in Figure 2. During normal operation of the train the selective relay 118 is maintained energized from the battery 114 through a circuit including conductors 112, jumper 214, conductor 210, and conductor switches 212, one each of which is located on each unit in the train. The jumper 214 is provided at the end of the train for closing the circuit.

With the selective relay 118 energized, the movable contact arms 122 and 116 will be in their uppermost position, whereupon the movable contacts 40 and 42 of the retardation controller device 10 will be effective in controlling the magnet valve devices 14. Both electromagnets of each magnet valve device will, therefore, be energized, thus seating the supply valves 92 and unseating the release valves 102.

When it is desired to effect a service application of the brakes, the handle 76 is moved in a counterclockwise direction, through the zone marked "Automatic control of retardation zone" in Figure 4, a distance in accordance with the desired rate of retardation. This movement of the handle rotates the cam members 68 and 204 correspondingly. Rotation of the cam member 68 positions the movable contacts 40 and 42 to the left.

During any movement of the handle 76 through the automatic control zone, the cam 204 engages the head 200 through a dwell period, and the slide valve 196 of the brake valve device 12 is therefore held in release position, maintaining the brake pipe in connection with the main reservoir.

As the contacts 40 and 42 are moved to the left, the roller 64 rolls off the high part of the cam 52, thereby opening contacts 40. Opening of contacts 40 deenergizes the electromagnets controlling the release valves 102, whereupon these valves are seated by their springs 110, thus cutting off the venting of the brake cylinders to the atmosphere on each unit in the train.

A short interval following the opening of contacts 40, roller 66 rolls off the high part of the cam 54, thereby opening contacts 42, and thus deenergizing the electromagnets controlling the supply valves 92. The suply valves 92 on each unit in the train are thereby unseated by their respective springs 100. Fluid under pressure, therefore, flows from each local reservoir 22 to the piston chamber 142, in each relay valve device 16, to the left of the piston 160, by way of pipe 98, past the unseated supply valve 92, and through passage 88 and pipe 90.

The fluid pressure thus supplied to each piston chamber 142 causes the piston 160 to move to the right. As the piston moves to the right the collar 166 on the rod 162 engages the slide valve 164 and moves it to the right to blank the exhaust port and passage 168. Further movement of the piston 160 then causes engagement of the rod 162 with the stem 158 to unseat the valve 148.

Unseating of the valve 148 permits fluid under pressure to flow from the local reservoir 22 to the brake cylinders 20 by way of pipe 98, past the unseated valve 148, pipe 152, and passages 192 and 190 of the associated triple valve device. The brakes are thus applied alike on each unit with fluid pressure building up in the brake cylinders at the maximum rate.

As the vehicle begins to decelerate, force of inertia causes the body 28 to move to the left. When the body has moved a sufficient distance to the left, the roller 66 will roll onto the high part of the cam 54, whereupon contacts 42 will be closed, thereby effecting a seating of the supply valves 92, whereupon the supply of fluid under pressure to the chambers 142, to the left of pistons 160, will be cut off.

When the supply of fluid to the left of each piston 160 is cut off, fluid under pressure will continue to flow to the brake cylinders by way of the chamber 144, until the pressure on the right side of each piston 160 overbalances the pressure on the left side, whereupon the piston will move to the left to permit the valve 148 to close. The supply of fluid to the brake cylinders will then be lapped.

With continuous deceleration of the vehicle, the coefficient of friction between the rubbing parts of the brakes will cause the rate of retardation to increase, so that the body 28 will move further to the left. This further movement will cause the roller 64 to roll onto the high part of the cam 52 and thus close contacts 40.

Closing of contacts 40 will energize the electromagnets of the valve devices 14 to unseat the release valves 102, and thus release fluid pressure from the left side of each piston 160 to the atmosphere, by way of pipe 90, passage 88, and port 108. The pressure on the right side of each piston 160, therefore, causes it to move toward its extreme left position, thereby moving the slide valve 164 therewith and releasing fluid pressure in the chamber 144 to the right of the piston, and hence that in the brake cylinders, to the atmosphere.

This release of fluid pressure from the brake cylinders will continue until the rate of retardation has been diminished to the point where the body 28 moves to the right. When the body moves to the right, roller 64 rolls off the high part of the cam 52, thereby opening contacts 40 and deenergizing the electromagnets controlling the release valves 102, whereupon the release valves are permitted to seat, and the release of fluid pressure from each of the piston chambers 142, to the left of piston 160, is cut off.

As the body 28 moves further to the right, roller 66 rolls off the high part of the cam 54 and opens contacts 42, thereby permitting the supply valves 92 to be unseated by their springs 100. Fluid under pressure will then again flow to the left side of the pistons 160, and the pistons will move to the right to cut off further release of fluid pressure from the brake cylinders.

The movement of each piston 160 to the right will be opposed by the fluid pressure remaining in the brake cylinders, and may or may not be sufficient to unseat the valves 148, depending upon the amount of pressure released from the brake cylinders to the atmosphere. If with diminishing speed the increase of friction between the rubbing parts of the brakes causes an increase in rate of retardation such that movement of the body 28 to the right is arrested, and it is caused to move just far enough to the left to effect closing of contacts 42 to cut off the supply of fluid pressure to the left of the pistons 160, then the valves 148 will not be unseated.

If, however, the fluid pressure in the brake cylinders is insufficient to maintain the desired rate of retardation, then the pistons 160 will move far enough to the right to unseat the valves 148 and permit fluid under pressure to again be supplied to the brake cylinders.

It will, therefore, be obvious that for a given positioning of the movable contacts 40 and 42, the inertia operated body 28 will move back and forth to control the supply of fluid under pressure to and its release from the brake cylinders to maintain a rate of retardation, due to operation of the brakes, in accordance with the position of the movable contacts, and hence with the position of the handle 76.

When the vehicle has been brought to a stop, the body 28 will assume a position to the extreme right, since there will be no force of inertia acting upon it. The vehicle may then be held at rest by moving the handle 76 to any position in the automatic control zone, and while this effects a maximum application of the brakes it may not be particularly objectionable.

If at any time while the train is in operation, the selective relay 118 should become deenergized, as by opening of one of the conductor's switches 212, or by a broken connection in the circuit thereto, the movable contact arms 122 and 116 will drop to their lowermost position. In this position the stationary contacts 36 and 38 of the retardation controller device will be effective in controlling the magnet valve devices 14.

When these contacts become effective, and assuming that the body 28 is in its extreme right hand position, both electromagnets of each magnet valve device will be deenergized, so that the supply valves 92 will be unseated and the release valves 102 seated. Fluid under pressure will then be supplied to the left of the piston 160 in each relay valve device 16, and an application of the brakes will thus be effected in the manner already described.

The position of the stationary contacts 36 and 38 is that corresponding to the extreme left position of the movable contacts 40 and 42, so that the body 28 must move through its maximum distance to the left before effecting a cutting off of the supply of fluid to the brakes. Or in other words, deenergizing of the selective relay 118 effects an application of the brakes for the maximum rate of retardation provided for by the retardation controller device 10.

If at any time while the train is in operation, the retardation controller device 10 should be rendered inoperative to effect an application of the brakes, the brakes may be applied by moving the handle 76 to the "application zone", as indicated in Fig. 4. In this position, the cam 204 draws the slide valve 196 to the left, bringing the brake pipe 173 into communication with the atmosphere through the cavity 197 in the slide valve, and thus venting the brake pipe to the atmosphere.

With a reduction in brake pipe pressure, the pressure to the right of the triple valve piston 176 will overbalance that to the left, causing the piston to move to the left, carrying the graduating valve 186 with it, and thereby bringing port 185 in the slide valve 184 into communication with the chamber 172. After a short movement the piston 176 also carries the slide valve 184 with it, bringing its port 185 into registration with passage 190 in the seat. As the port 185 moves into registration with the brake cylinder passage 190, fluid under pressure flows from the auxiliary reservoir 178 to the brake cylinders, thus effecting an application of the brakes.

When the desired braking effect has been produced, the handle 76 may be moved to the "lap zone", as indicated in Fig. 4, whereupon the slide valve 196 will be moved to lap position, thereby cutting off further release of fluid pressure from the brake pipe to the atmosphere. When it is desired to effect a release of the brakes, the handle 76 may be moved to the automatic control zone or to "release" position, as in either case the slide valve 196 is moved to release position. Further control of the triple valve device 18 may be effected by manipulation of the handle 76 to operate the brake valve device 12, as is done in the usual manner with ordinary type of brake valve devices commonly employed in the operation of fluid pressure brakes.

If it is desired to effect an emergency application of the brakes when controlling the application through the retardation controller device, the handle 76 is moved to the extreme counter-clockwise position in the "automatic control of retardation zone". In this position, the retardation controller is effective in maintaining the maximum rate of retardation provided for, which is usually that corresponding to the maximum adhesion between wheels and rails under the best possible track conditions. As before described, this maximum rate is that effected when the selective relay 118 is deenergized.

When it is desired to effect an emergency application of the brakes when controlled by the brake valve device 12, the handle 76 is moved to the extreme counterclockwise position in the "application zone", whereupon the slide valve 196 is moved to its extreme left position, where it connects the brake pipe to the atmosphere to release fluid pressure therefrom at the maximum rate.

When fluid pressure is thus released from the brake pipe, each triple valve device 18 operates in the usual manner for such emergency applications. Slide valve 184 is moved to its extreme left hand position to connect the brake cylinder passage 190 directly to the chamber 172, to permit fluid under pressure to flow from the auxiliary reservoir 178 to the brake cylinders at the maximum rate.

If at any time it is desired to transfer the control of the brakes from the retardation controller device 10 wholly to the brake valve device 12, cocks 208 are closed and cocks 206 are opened, so that the relay valve devices 16 will be wholly ineffective to supply fluid under pressure to and release it from the brake cylinders, and the triple valve devices may therefore vent the brake cylinders directly to the atmosphere through the cocks 206.

While the relay valve device 16 on each unit in the train may operate independently of each other, I have provided a pipe 220 for maintaining the portion of the piston chambers 142 to the left of the pistons 160 in constant communication with each other. By this means a more nearly synchronous operation of the several relay valve devices is obtained, and there is additional assurance that the brakes will be applied alike on each unit in the train.

Fluid pressure may be supplied to the local reservoirs 22 on each unit in the train from the brake pipe 173 through a ball check valve 222 and a choke plug 224. When the pressure in the local reservoir 22 falls below that of the brake pipe, the ball check valve unseats to permit pressure to be supplied thereto, but prevents back flow of pressure from the reservoir to the brake pipe. The choke plug 224 prevents rapid reductions in brake pipe pressure when the pressure in each reservoir 22 drops, which might otherwise cause undesired operation of the triple valve devices.

When it becomes necessary to tow the train with a towing vehicle, the brakes on the train may be operated from the brake valve device on the towing vehicle by connecting the brake pipe of the train with the brake pipe of the towing vehicle, and opening cocks 206 and closing cocks 208 and 226 on the train. This permits the brakes on the train to be operated from the brake valve device on the towing vehicle in the usual manner.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a vehicle brake apparatus, the combination with a brake cylinder, a brake pipe, and a valve device operated upon a reduction in brake pipe pressure for controlling the supply of fluid under pressure to said brake cylinder, of a retardation controller device providing for effecting different rates of retardation of the vehicle, means controlled by said retardation controller device for also controlling the supply of fluid under pressure to said brake cylinder, control means for varying the setting of said retardation controller device to effect different rates of retardation and to effect reductions in brake pipe pressure, and means for preventing reductions in brake pipe pressure by said brake pipe when said retardation controller device is effective in controlling the supply of fluid under pressure to said brake cylinder by said last means.

2. In a vehicle brake apparatus, the combination with a brake cylinder, of a manually operated control element, valve means responsive to movement of said element for causing a reduction in brake pipe pressure to effect a supply of fluid under pressure to said brake cylinder, means also responsive to movement of said element for effecting a supply of fluid under pressure to said brake cylinder to produce a rate of retardation due to application of the brakes in accordance with the degree of movement of said element, and means whereby said valve means is rendered inoperative when said last means is operated.

3. In a vehicle brake apparatus, the combination with a brake cylinder, a reservoir and a relay valve device for controlling the supply of fluid under pressure from said reservoir to said brake cylinder, of a second reservoir and a second valve device for controlling the supply of fluid under pressure from said second reservoir to said brake cylinder, a retardation controller device and means associated therewith for controlling said first valve device, a brake valve device for effecting a reduction in brake pipe pressure to effect operation of said second valve device, and a manually operated element for controlling operation of said brake valve device and retardation controller device and adapted to hold said brake valve device in release position when in position for controlling operation of said retardation controller device.

4. In a vehicle brake apparatus, the combination with a brake valve device operable to produce a reduction in brake pipe pressure to effect an application of the brakes, of a retardation controller device operable to effect and control an application of the brakes to produce a desired rate of retardation due to braking, a manually operated element for operating both of said devices, and means whereby movement of said element to effect a service application of the brakes renders said retardation controller device operable and said brake valve device inoperable to effect said application.

5. In a railway train brake system, the combination with a plurality of brake equipments for the units in the train, each of said equipments including at least one brake cylinder and pressure responsive means and electro-responsive means for controlling the flow of fluid under pressure to said brake cylinder, of a brake valve device and a retardation controller device for controlling, respectively, the operation of said pressure responsive means and electro-responsive means from one unit in the train, circuits connecting said retardation controller device with said electro-responsive means, pipe connecting said brake valve device with said pressure responsive means, and a manually operated element providing for rendering said retardation controller device effective and said brake valve device ineffective in controlling normal applications of the brakes but providing for control by said brake valve device when said retardation controller device becomes ineffective.

6. In a railway train brake system, the combination with a plurality of brake equipments for the units in the train, each of said units including at least one brake cylinder, a triple valve device and a relay valve device, both of said devices being adapted to control the supply of fluid under pressure to and its release from said brake cylinder, and a magnet valve device for controlling operation of said relay valve device; of a brake pipe; a brake valve device adapted to effect a reduction in brake pipe pressure to cause operation of said triple valve device; a retardation controller device for controlling operation of said magnet valve device; circuits for connecting said magnet valve device to said retardation controller device; and a manually operated control element for varying at will the setting of said retardation controller device at one time and for operating said brake valve device at another time.

7. In a railway train brake system, the combination with a plurality of brake equipments for the units in the train, each of said units including at least one brake cylinder, a triple valve device and a relay valve device, both of said devices being adapted to control the supply of fluid under pressure to and its release from said brake cylinder, and a magnet valve device for controlling operation of said relay valve device; of a brake pipe; a brake valve device adapted to effect a reduction in brake pipe pressure to cause operation of said triple valve device; a retardation controller device having movable and stationary contacts for controlling operation of said magnet valve device; circuits for connecting said magnet valve device to said contacts; a relay adapted to connect said circuits to either said stationary contacts or said movable contacts; and manually operated means for positioning said movable contacts at one time and for operating said brake valve device at another time.

8. In a railway train braking system, the combination with a plurality of braking equipments operable either pneumatically or electro-pneumatically to effect either a service or an emergency application of the brakes, of a retardation controller device for controlling application of the brakes electro-pneumatically from one unit in the train, a control circuit extending throughout the train, means whereby said retardation controller device is conditioned to control both service and emergency applications of the brakes when said circuit is closed and to effect an emergency application of the brakes when said circuit is interrupted, and means providing for pneumatic control of applications of the brakes when said retardation controller device becomes ineffective.

9. In a railway train brake system, the combination with a plurality of braking equipments, each of said equipments including a brake cylinder, a relay valve device for controlling the supply of fluid under pressure to and its release from said brake cylinder, and a magnet valve device for controlling operation of said relay valve device; of a retardation controller device having movable and stationary sets of contacts, said movable contacts being movable to different positions to select a desired rate of retardation and operable thereafter to control said magnet valve device to maintain the selected rate, and said stationary contacts being operable to control said magnet valve device to maintain a maximum rate of retardation; circuits for connecting said contacts to said magnet valve device; and a relay controlling said circuits and adapted when energized to render said movable contacts effective in controlling said magnet valve device and when deenergized to render said stationary contacts effective.

10. In a railway train brake system, the combination with a plurality of braking equipments, each of said equipments including a brake cylinder, a relay valve device for controlling a supply of fluid under pressure to and its release from said brake cylinder, and a magnet valve device for controlling operation of said relay valve device; of a retardation controller device having movable and stationary sets of contacts, said movable contacts being movable to different positions according to a desired rate of retardation and operable thereafter to maintain said rate, said stationary contacts being operable to control said magnet valve device to maintain a maximum rate of retardation; circuits for connecting said contacts to said magnet valve device; a control circuit extending throughout the train; a relay connected in said control circuit; and means whereby when said control circuit is closed said relay is operated to connect said movable set of contacts to said magnet valve device and when said control circuit is opened said relay is operated to connect said stationary set of contacts to said magnet valve device.

11. In a railway train brake system, the combination with a plurality of braking equipments, each of said equipments including a brake cylinder, a relay valve device for controlling the supply of fluid under pressure to and its release from said brake cylinder, and a magnet valve device for controlling operation of said relay valve device; of a retardation controller device having movable and stationary sets of contacts, said movable contacts being moved to different positions to select a desired rate of retardation and operable thereafter to control said magnet valve device to maintain said selected rate of retardation, said stationary contacts being operable to control said magnet valve device to maintain a maximum rate of retardation; circuits for connecting said contacts to said magnet valve device; a control circuit extending throughout the train; a relay connected in said circuit and adapted to be energized when said circuit is closed and deenergized when said circiut is opened, said relay controlling said circuits from said contacts to said magnet valve device and operable when energized to connect said movable set of contacts to said magnet valve device and when deenergized to connect said stationary set of contacts to said magnet valve device; and a switch device associated with each of said braking equipments and operable to control opening and closing of said control circuit.

12. In a vehicle brake apparatus, the combination with a brake cylinder, of a valve device operated upon an increase in pressure for controlling a communication through which fluid under pressure is supplied to said brake cylinder, a second valve device operated upon a decrease in pressure for also controlling said communication, means including a retardation controller device providing for the selection of different rates of retardation for controlling the operation of said first valve device, means including a brake valve device for controlling operation of said second valve device, and a control element operable at one time to actuate said retardation controller device to select a desired rate of retardation and operable at another time to actuate said brake valve device.

13. In a vehicle brake apparatus, the combination with a brake cylinder, of a valve device operated upon an increase in pressure for controlling a communication through which fluid under pressure is supplied to said brake cylinder, a brake pipe, a second valve device in series with said first valve device and operated upon a decrease in brake pipe pressure for closing said communication, electropneumatic means for controlling operation of said first valve device, a brake valve device for effecting reductions in brake pipe pressure, a control element for controlling said electropneumatic means and said brake valve device, and means whereby when said control element is operated to effect operation of said electropneumatic means said brake valve device is inoperative to effect reductions in brake pipe pressure.

14. In a railway train brake system, the combination with a plurality of braking equipments, each of said equipments including a brake cylinder, and valve means for controlling the supply of fluid under pressure to and its release from said brake cylinder; of a retardation controller device having normally closed movable contacts and normally open stationary contacts and a body movable according to the rate of retardation of the vehicle; means for effecting opening of said normally closed contacts and for moving said contacts to different positions according to a desired rate of retardation; means responsive to the opening of said movable contacts for causing said valve means in each of said braking equipments to effect a supply of fluid under pressure to said brake cylinder; means whereby movement of said inertia operated body subsequently effects closing of said movable contacts to maintain the selected rate of retardation; a control circuit extending throughout the train; and means responsive to an opening of said circuit for rendering said movable contacts ineffective to control said valve means and for rendering said stationary contacts effective in controlling said valve means to produce a maximum rate of retardation.

15. In a vehicle brake system, the combination with a retardation controller device having movable contacts operable to control an application of the brakes to maintain a rate of retardation according to movement of said contacts, of a brake valve device having a release position and an application position, a cam having a rising portion and a dwell portion for controlling operation of said contacts, a second cam also having a rising portion and a dwell portion for controlling operation of said brake valve device, a control element for operating said cams, means whereby when the rising portion of said first cam is operating said contacts the dwell portion of said second cam maintains said brake valve in release position and when the rising portion of said second cam operates said brake valve device to application position the dwell portion of said first cam maintains said contacts to maximum rate of retardation position.

JOHN W. LOGAN, Jr.